3,317,493
TERPOLYMER CONTAINING METHYL METHACRYLATE, 2-ETHYLHEXYL ACRYLATE AND METHACRYLIC ACID AND COMPOSITIONS CONTAINING SAME
Richard N. Selby, Williamsville, N.Y., assignor to E. I. du Pont de Nemours and Company, Wilmington, Del., a corporation of Delaware
No Drawing. Filed Nov. 5, 1963, Ser. No. 321,446
3 Claims. (Cl. 260—80.5)

This invention relates to methyl methacrylate interpolymers, and to liquid coating compositions comprising such interpolymers.

Many different methyl methacrylate interpolymers have been made heretofore for use in the preparation of protective and decorative coating compositions for application onto a variety of substrates. Some of these interpolymers have found considerable commercial acceptance for use on particular types of substrates such as steel and similar iron or iron alloys. However, the available methyl methacrylate interpolymers which are relatively satisfactory for use on steel or the like, are unacceptable for use on aluminum substrates.

The primary deficiency of these prior art methyl methacrylate interpolymers is that they do not adhere adequately to aluminum, in spite of the fact that they adhere sufficiently to steel. In addition, methyl methacrylate interpolymers which possess operable flexibility properties for use on steel, when modified to provide adhesion onto aluminum, either are too soft, or to the other extreme, too brittle for commercial acceptance. Consequently, the methyl methacrylate interpolymers commercially available heretofore lack the weatherability, moisture, and chemical resistance, flexibility, and ruggedness when applied onto aluminum.

This lack of suitable protective coating composition has heretofore greatly hindered the use of aluminum in applications where it is necessary to provide the aluminum with such a coating, including extensive use as automobile trim. Similarly, this lack of protective coatings which can be pigmented to provide a decorative effect, has prevented extensive use of aluminum in building and other structural uses, where it is desired to obtain a durable, decorative coating for the aluminum.

An object of this invention is to provide an improved methyl methacrylate interpolymer. Another object is to provide an improved methyl methacrylate interpolymer which is particularly suitable for use as a protective coating on aluminum. A further object is to provide a liquid coating composition comprising such an improved methyl methacrylate interpolymer. An additional object is to provide an improved process for coating an aluminum substrate. A still further object is to provide a structure having coated thereon such an improved methyl methacrylate interpolymer.

These and other objects are fully attained by an interpolymer of 65.5–71.5% by weight copolymerized methyl methacrylate, 27–33% by weight copolymerized 2-ethylhexyl acrylate, and 1.5–2.5% by weight copolymerized methacrylic acid, said interpolymer having an inherent viscosity of at least 0.4. This unique interpolymer may be dissolved in a volatile organic solvent to obtain a liquid coating composition which is useful for coating various substrates, and which is particularly suitable for coating aluminum.

It is extremely critical to this invention that the interpolymer contain copolymerized methyl methacrylate, 2-ethylhexyl acrylate, and methacrylic acid in the specified amounts. If the interpolymer contains more than 33% by weight of 2-ethylhexyl acrylate, the interpolymer is undesirably soft, and possesses insufficient alkali resistance, decreased weatherability, and inadequate tensile strength. If the interpolymer contains less than 27% of 2-ethylhexyl acrylate, the interpolymer has insufficient flexibility. If the interpolymer contains greater than 2.5% methacrylic acid, solutions of the interpolymer in organic solvents have excessively high viscosities, resulting in poor application properties. Moreover, if greater than 2.5% methacrylic acid is present, the interpolymer has inadequate resistance to water and alkali. If less than 1.5% methacrylic acid is present, the interpolymer possesses insufficient adhesion properties and is inadequately resistant to alkali.

It is also very critical that the interpolymer has an inherent viscosity of at least 0.4, measured at 25° C. using 25 milligrams of the interpolymer in 50 cc. of chloroform. If the inherent viscosity is less than 0.4, the interpolymer has inadequate flexibility. Preferably, the interpolymer should not have an inherent viscosity of greater than 0.5, to insure that solutions of the interpolymer in common organic solvents have optimum viscosities at room temperature.

The method by which the methyl methacrylate interpolymers of this invention may be prepared is not critical. It is most convenient to prepare this interpolymer by the familiar solution polymerization technique using the solvent in which it is desired to dissolve the interpolymer for use as a liquid coating composition. However, the interpolymer may also be prepared by other polymerization techniques such as bulk, suspension, or emulsion polymerization of the monomers, as is well known in the art. Suitable polymerization methods are disclosed in Riddle, Monomeric Acrylic Esters, Reinhold Publishing Corp., New York (1954), pp. 29–54.

The interpolymer of this invention may be dissolved in any desired volatile organic solvent, such as benzene, xylene, toluene, acetone, methyl ethyl ketone, cyclohexanone, methylene chloride, chloroform, ethylene dichloride, trichloroethylene, chlorobenzene, methyl formate, ethyl acetate, cyclohexyl acetate, isobutyl propionate, butyl lactate, dioxane, tetrahydrofuran, ethylene glycol monoethyl ether, and the like, to thereby form a liquid coating composition.

The interpolymer of this invention dissolved in such a solvent, may be used "as is" to provide clear, protective coatings for metal, wood, or other types of substrates. Other ingredients commonly used in lacquers and paint may be incorporated into this composition, including pigments, pigment dispersing agents, antifoam agents, and so forth.

The liquid coating composition provided by this invention may be applied to the substrate to be coated by spraying, brushing, dipping, or by other familiar techniques known to those skilled in the art.

The composition of this invention provides protective and decorative coatings which possess the hardness, excellent weatherability, resistance to ultraviolet degradation, resistance to water, acids, alkali, and other chemicals, and water white color and transparency of polymethyl-methacrylate, plus markedly increased flexibility and improved adhesion to various substrates. Thus, this invention provides a methyl methacrylate interpolymer wherein the flexibility and adhesion have been substantially increased, but wherein the desired properties of polymethyl-methacrylate surprisingly have not been deleteriously affected. As stated hereinbefore, this interpolymer is especially suitable for use as a coating on aluminum. It is quite unexpected that the composition of this invention is an excellent coating for aluminum, in view of the fact that somewhat similar methyl methacrylate interpolymers of the prior art which have found commercial acceptance as coatings for other types of substrates, such as steel, are unsatisfactory for use on aluminum.

This invention is further illustrated by the following examples wherein all percentages are in terms of percent by weight, except where reference is made to percent elongation.

EXAMPLE 1

A methyl methacrylate/2-ethylhexyl acrylate/methacrylic acid interpolymer was prepared by charging 58 grams of methyl methacrylate, 40 grams of 2-ethylhexyl acrylate, 2 grams of methacrylic acid, 54 grams of toluene, and 0.50 gram of azioisobutyronitrile to a heavy walled glass bottle having a volume of approximately 350 cc. The bottle was capped and placed in a rotating basket immersed in a water bath. The water bath was heated from 20° C. at such a rate that after 3 hours the bath temperature was 84° C. and after 6 hours the bath temperature was 98° C. After 6 hours, the bottle was withdrawn from the bath, cooled, and the product removed therefrom. The interpolymer thus formed was isolated by precipitating from the product by addition of methanol. The material obtained was dissolved in acetone and reprecipitated with methanol, then redissolved in acetone, reprecipitated by addition of cold water and dried. The 2-ethylhexyl acrylate content of the interpolymer was determined by infrared analysis, and the methacrylic acid content was determined by dissolving a portion of the polymer in acetone and titrating against sodium hydroxide. This analysis showed that the product interpolymer consisted of 68% by weight copolymerized methyl methacrylate, 30% copolymerized 2-ethylhexyl acrylate, and 2% copolymerized methacrylic acid. This interpolymer had an inherent viscosity of 0.43, measured at 25° C. using 25 milligrams of polymer dissolved in 50 cc. of chloroform. This interpolymer was evaluated by the following tests:

*Test 1.*—A portion of the interpolymer was dissolved in methyl ethyl ketone to form a 20% solution, and this solution was cast onto a glass plate to form a film which was thoroughly dried. The dried film was approximately 0.002 inch thick. The Knoop hardness of the dried film was 6 at 25° C.

*Test 2.*—A film prepared as shown in Test 1 was removed from the glass plate, and the elongation and tensile strength thereof was determined according to the ASTM procedure D–882–56T. It was found that the film could be elongated by approximately 16% before rupture, indicating that the interpolymer was on the order of 5 times more flexible than polymethyl-methacrylate. The tensile strength of the film of this interpolymer was 3720 lb./in.$^2$.

*Test 3.*—Panels of aluminum and cold rolled steel (25 mils thick) were coated with this interpolymer by dipping the panels into the solution prepared as shown in Test 1, using toluene in place of methyl ethyl ketone. Excess solution was permitted to drip off of the panel. After the panels were thoroughly dried, they were bent over a conical mandrel having a minimum diameter of $\frac{1}{16}$ inch. There was no rupture or loss of adhesion of the coating.

*Test 4.*—Aluminum panels were coated with this interpolymer as shown in Test 3. These coated panels were placed in contact with mortar as specified by The Aluminum Window Manufacturers Association Specification 602.1 (Aluminum Window Manufacturers Association, 250 Park Avenue, New York 17, New York). The panel showed no sign of attack, indicating excellent alkali resistance of the interpolymer coating. The coated panels were also unaffected when contacted with dilute hydrochloric acid by the procedure outlined in this same specification.

*Test 5.*—Aluminum panels coated as shown in Test 3 were subjected to two accelerated corrosion tests which are commonly used by the automotive industry, namely, the copper accelerated salt spray test described in ASTM procedure B–368–61T, at a 16-hour exposure, and the accelerated corrosion test described in ASTM procedure B–380–61T, using a 16-hour test cycle. The coatings and underlying substrates subjected to these tests showed no attack, demonstrating the excellent protective properties and resistance of the coating to corrosive atmospheres.

*Test 6.*—Panels of aluminum coated with this interpolymer as shown in Test 3 were subjected to an accelerated weatherometer test wherein the panels were exposed to ultraviolet light and intermittent fresh water spray. No failure of the coating was observed after 663 hours of exposure. For comparative purposes the following commercially available coating compositions which contain methyl methacrylate interpolymers and which are considered to be acceptable coating compositions for various metal substrates, particularly steel, were tested under the same conditions. In every instance these prior art coating compositions showed discoloration, spotting and other failure when similarly exposed for 663 hours:

(1) 59.5% methyl methacrylate/40% n-butyl methacrylate/0.5% methacrylic acid, inherent viscosity of 0.28
(2) 50% methyl methacrylate/50% ethyl acrylate inherent viscosity of 0.39
(3) 69% methyl methacrylate/30% n-butyl methacrylate/0.5% methacrylic acid inherent viscosity 0.20
(4) 86% methyl methacrylate/14% ethyl acrylate inherent viscosity 0.45
(5) 96% methyl methacrylate/4% ethyl acrylate inherent viscosity 0.45.

EXAMPLE 2

This example shows the results obtained when the interpolymer contains more than 33% of copolymerized 2-ethylhexyl acrylate. An interpolymer of methyl methacrylate/2-ethylhexyl acrylate/methacrylic acid prepared as shown in Example 1, except that 38 grams of methyl methacrylate, 50 grams of 2-ethylhexyl acrylate, and 2 grams of methacrylic acid was used instead of the quantities of monomers shown in Example 1. The interpolymer was purified and analyzed as shown in Example 1. This interpolymer contained 62% copolymerized methyl methacrylate, 36% copolymerized 2-ethylhexyl acrylate, and 2% methacrylic acid, and had an inherent viscosity of 0.45. When evaluated as shown in Test 4 of Example 1, the coating of this interpolymer on aluminum showed that mortar diffused into the film and could not be wiped off, indicating poor alkali resistance.

EXAMPLE 3

This example illustrates the performance of an interpolymer containing less than 27% of copolymerized 2-ethylhexyl acrylate. An interpolymer was prepared as shown in Example 1, except that 58 grams of methyl methacrylate, 40 grams of 2-ethylhexyl acrylate, 2 grams of methacrylic acid, 54 grams of toluene, and 1.0 gram of azioisobutyronitrile were charged to the glass bottle. The product interpolymer as isolated and analyzed as shown in Example 1 contained 74% copolymerized methyl methacrylate, 24% copolymerized 2-ethylhexyl acrylate, and 2% copolymerized methacrylic acid, and had an inherent viscosity of 0.48. Films of this interpolymer tested as shown in Test 2 of Example 1 could be elongated only 3.8% before rupture, indicating very poor flexibility. When tested as shown in Test 3 of Example 1, coatings of this interpolymer on aluminum and cold rolled steel panels cracked and crazed severely when the panels were bent over a conical mandrel, again illustrating the poor flexibility of this interpolymer.

EXAMPLE 4

This example illustrates the results obtained when the interpolymer contains less than 1.5% of copolymerized methacrylic acid. An interpolymer was prepared as shown in Example 1 except that 60 grams of methyl methacrylate, 40 grams of 2-ethylhexyl acrylate, and 0.5 gram of methacrylic acid were charged to the glass bottle in place of the monomeric quantities as shown therein. The interpolymer was isolated and analyzed as shown in Example 1 and contained 69.5% copolymerized methyl methacrylate, 30% 2-ethylhexyl acrylate, and 0.5% methacrylic acid. Aluminum panels were coated with this interpolymer as shown in Test 3 of Example 1. When a sharp cut is made into the coating, the coating lifted readily from the substrate in the vicinity of the cut and could be peeled from the substrate, indicating the inadequate adhesion of the interpolymer to the aluminum substrate.

EXAMPLE 5

This example shows the performance of an interpolymer having an inherent viscosity of less than 0.4. An interpolymer was prepared by a method similar to that used in Example 1, except that the polymerization temperature was increased to 110° C. and a flask equipped with an agitator, water cooled condenser, and oil bath heater was used in place of the equipment described in Example 1. The interpolymer product was isolated and analyzed as shown in Example 1. This interpolymer contained 71% copolymerized methyl methacrylate, 27% copolymerized 2-ethylhexyl acrylate, and 2% methacrylic acid, and had an inherent viscosity of 0.29. When tested as shown in Test 3 of Example 1, a coating of this interpolymer on aluminum showed a severe cracking when the panel was bent over a conical mandrel, thus showing inadequate flexibility.

This invention has been described in considerable detail. However, there obviously are many modifications and variations which can be made in these details without departing from the spirit and scope of this invention. Therefore, it is to be understood that this invention is not to be limited except as defined by the appended claims.

What is claimed is:

1. An interpolymer of 65.5–71.5% by weight copolymerized methyl methacrylate, 27–33% by weight copolymerized 2-ethylhexyl acrylate, and 1.5–2.5% by weight copolymerized methacrylic acid, said interpolymer having an inherent viscosity of at least 0.4.

2. A liquid coating composition comprising an interpolymer of 65.5–71.5% by weight copolymerized methyl methacrylate, 27–33% by weight copolymerized 2-ethylhexyl acrylate, and 1.5–2.5% by weight copolymerized methacrylic acid, said interpolymer having an inherent viscosity of at least 0.4 and being dissolved in a volatile organic solvent.

3. A structure comprising an aluminum substrate having coated thereon a composition comprising an interpolymer of 65.5–71.5% by weight copolymerized methyl methacrylate, 27–33% by weight copolymerized 2-ethylhexyl acrylate and 1.5–2.5% by weight copolymerized methacrylic acid, said interpolymer having an inherent viscosity of at least 0.4.

References Cited by the Examiner

UNITED STATES PATENTS

| | | | |
|---|---|---|---|
| 2,795,564 | 6/1957 | Conn et al. | 260—80.5 |
| 2,962,465 | 11/1960 | Lindstrom et al. | 260—80.5 |
| 3,057,812 | 10/1962 | Straughan et al. | 117—132 |
| 3,106,486 | 10/1963 | Harren et al. | 117—132 |

JOSEPH L. SCHOFER, *Primary Examiner.*

W. HOOVER, *Assistant Examiner.*